(12) United States Patent
Kinoshita et al.

(10) Patent No.: US 11,489,402 B2
(45) Date of Patent: Nov. 1, 2022

(54) ELECTRIC COMPRESSOR

(71) Applicant: KABUSHIKI KAISHA TOYOTA JIDOSHOKKI, Kariya (JP)

(72) Inventors: Yusuke Kinoshita, Kariya (JP); Shingo Enami, Kariya (JP); Junya Yano, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 300 days.

(21) Appl. No.: 16/725,274

(22) Filed: Dec. 23, 2019

(65) Prior Publication Data

US 2020/0212757 A1 Jul. 2, 2020

(30) Foreign Application Priority Data

Dec. 27, 2018 (JP) .............................. JP2018-244242

(51) Int. Cl.
*H02K 3/50* (2006.01)
*H02K 5/24* (2006.01)
*H02K 7/14* (2006.01)
*H02K 11/33* (2016.01)
*B60H 1/32* (2006.01)
*B60H 1/00* (2006.01)

(52) U.S. Cl.
CPC ............ *H02K 5/24* (2013.01); *B60H 1/3222* (2013.01); *H02K 3/50* (2013.01); *H02K 7/14* (2013.01); *H02K 11/33* (2016.01); *B60H 2001/006* (2013.01); *H02K 2203/09* (2013.01); *H02K 2207/03* (2013.01); *H02K 2211/03* (2013.01)

(58) Field of Classification Search
CPC ........ H02K 5/10; H02K 5/06; H02K 11/0141; H02K 11/33; H02K 5/22; H02K 5/225; H02K 11/0073; H02K 11/32; H02K 5/11
See application file for complete search history.

(56) References Cited

U.S. PATENT DOCUMENTS

| | | | |
|---|---|---|---|
| 9,973,055 B2 * | 5/2018 | Suitou | H02K 5/24 |
| 10,087,942 B2 * | 10/2018 | Yano | F04B 27/0873 |
| 2004/0145860 A1 | 7/2004 | Shindo | |
| 2007/0222330 A1 | 9/2007 | Innami et al. | |
| 2008/0136287 A1 | 6/2008 | Lee | |
| 2011/0175470 A1 | 7/2011 | Kinoshita et al. | |
| 2012/0286603 A1 | 11/2012 | Suga et al. | |
| 2015/0054365 A1 * | 2/2015 | Kinoshita | H02K 11/33 |
| | | | 310/71 |
| 2016/0336831 A1 * | 11/2016 | Horizumi | H02K 5/10 |

FOREIGN PATENT DOCUMENTS

| | | |
|---|---|---|
| CN | 102128159 A | 7/2011 |
| CN | 102780320 A | 11/2012 |
| JP | 2004-228126 A | 8/2004 |

* cited by examiner

*Primary Examiner* — Leda T Pham
(74) *Attorney, Agent, or Firm* — Sughrue Mion, PLLC

(57) ABSTRACT

An electric compressor includes a motor housing, an inverter, a cover, and a fastener. The inverter includes a board; an electronic component; a holder composed of an insulating material, the holder containing the electronic component and supporting the board; a bus bar integrated with the holder, and electrically connected to a circuit pattern and the motor housing; and a tubular member interposed between the cover and the bus bar, with the fastener inserted in the tubular member. The fastening force from the fastener causes the tubular member to press the bus bar toward the motor housing.

6 Claims, 3 Drawing Sheets

ELECTRIC COMPRESSOR

This nonprovisional application is based on Japanese Patent Application No. 2018-244242 filed on Dec. 27, 2018 with the Japan Patent Office, the entire contents of which are hereby incorporated by reference.

BACKGROUND

The present disclosure relates to an electric compressor.

DESCRIPTION OF THE BACKGROUND ART

Electric compressors for use in air conditioners of vehicles have been known. For example, Japanese Patent Laying-Open No. 2004-228126 discloses an electric compressor in which a circuit board is disposed on a frame resin member having an insert-molded shield and the resin member is assembled with a motor housing, so that the shield electrically connects the ground pattern on the circuit board to the motor housing.

SUMMARY

In the electric compressor described in Japanese Patent Laying-Open No. 2004-228126, electronic components mounted on the circuit board, such as a power transistor and a capacitor, are disposed in contact with the outer periphery of the motor housing. Accordingly, the relative displacement of the electronic components from the board cannot be fully prevented, thus exhibiting unsatisfactory vibration resistance.

In recent years, with the increase in the number of electronic devices mounted on a vehicle, the required standards (e.g., EMC) have become more and more strict. Thus, an inverter requires more reliable measures against noise.

An object of the present disclosure is to provide an electric compressor with an inverter having an improved vibration resistance and reduced noise at the same time.

An electric compressor according to the present disclosure includes: a motor housing composed of an electrically conductive material and containing a motor that drives a compression mechanism; an inverter that supplies power to the motor; a cover defining, together with the motor housing, a space in which the inverter is contained; and a fastener fixing the cover to the motor housing. The inverter includes a board having a circuit pattern thereon; an electronic component mounted on the board; a holder composed of an insulating material, the holder containing the electronic component and supporting the board; a bus bar integrated with the holder, and electrically connected to the circuit pattern and the motor housing; and a tubular member interposed between the cover and the bus bar, with the fastener inserted in the tubular member. A fastening force from the fastener causes the tubular member to press the bus bar toward the motor housing.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
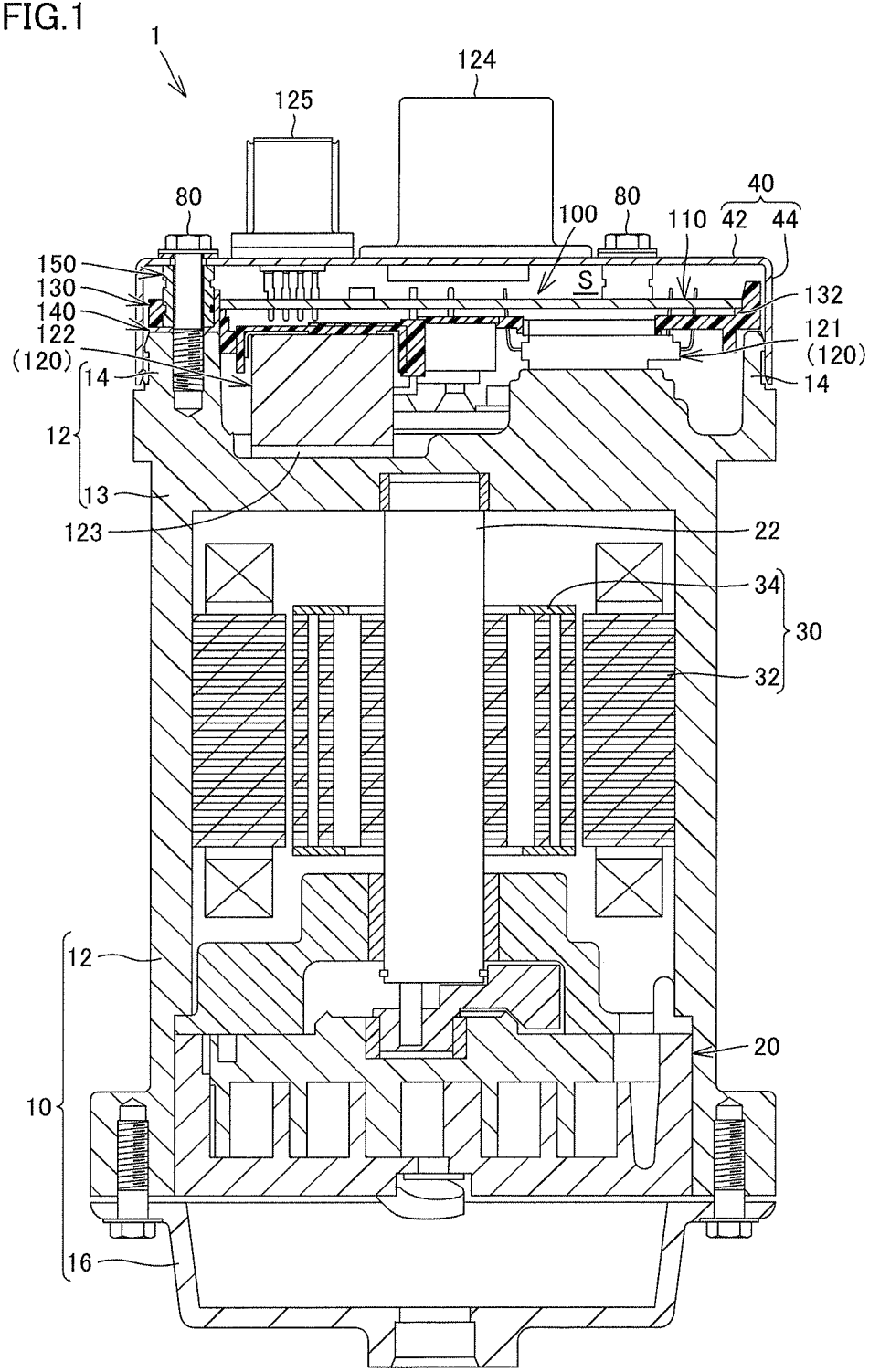
FIG. 1 is a cross-sectional view schematically showing an electric compressor in an embodiment of the present disclosure.

An embodiment of the present disclosure will now be described with reference to the drawings. In the drawings referred to hereinafter, identical or corresponding parts are denoted by identical reference numbers.

Figure 2:
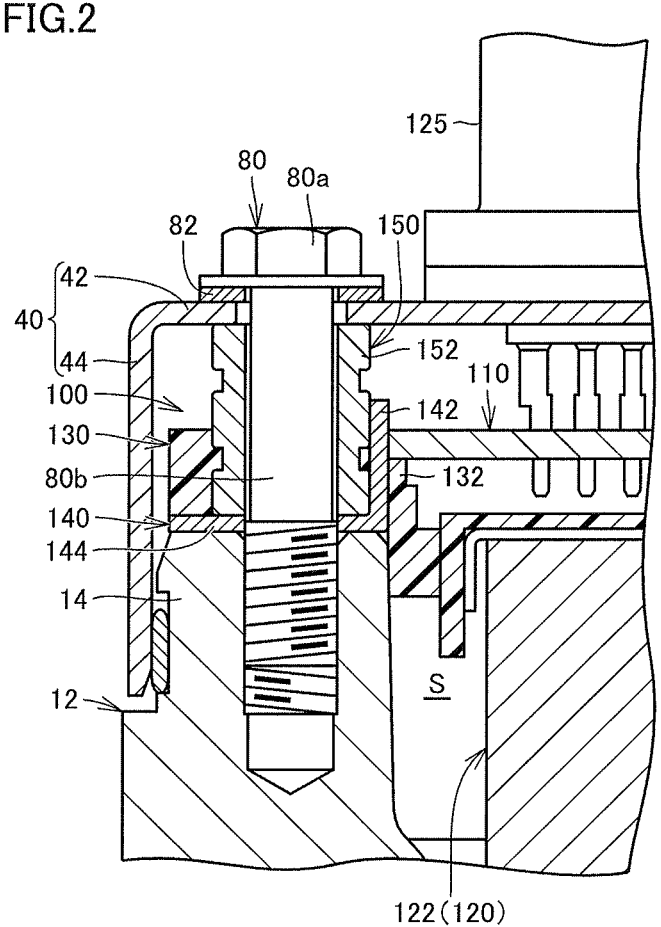
FIG. 2 schematically shows a part around a bus bar and a tubular member of the electric compressor shown in FIG. 1.

FIG. 1 is a cross-sectional view schematically showing an electric compressor in an embodiment of the present disclosure. FIG. 2 schematically shows a part around a bus bar and a tubular member of the electric compressor shown in FIG. 1. An electric compressor 1 in the present embodiment is used for, for example, an air conditioner for a vehicle.

As shown in FIG. 1 and FIG. 2, the electric compressor 1 includes a housing 10, a compression mechanism 20, a motor 30, a cover 40, at least one fastener 80, and an inverter 100.

The housing 10 contains the compression mechanism 20 and the motor 30. The housing 10 is composed of an electrically conductive material (e.g., aluminum). The housing 10 includes a motor housing 12 and a discharge housing 16.

The motor housing 12 includes a housing body 13 and a connecting portion 14.

The housing body 13 contains the compression mechanism 20 and the motor 30. A working medium flows into the housing body 13 from the outside of the housing body 13 through an intake port (not shown).

The connecting portion 14 is connected to the housing body 13. The connecting portion 14 is a portion that connects the fastener 80.

The compression mechanism 20 is contained in the housing body 13. The compression mechanism 20 compresses the working medium that has flowed in the housing body 13. To the compression mechanism 20, a shaft 22 is connected.

The discharge housing 16 is connected to the housing body 13 with, for example, bolts. The discharge housing 16 has a discharge port for discharging the working medium output from the compression mechanism 20.

The motor 30 drives the compression mechanism 20. The motor 30 includes a stator coil 32 disposed in the housing body 13, and a rotor 34 disposed inside the stator coil 32. The motor 30 drives the compression mechanism 20 by rotating the shaft 22.

The cover 40 defines, together with the motor housing 12, an inverter space S in which the inverter 100 is contained. The cover 40 is composed of metal. The cover 40 includes a top panel 42 and a peripheral wall 44.

The top panel 42 is disposed opposite to the housing body 13 in the axial direction of the shaft 22. The top panel 42 is in the shape of a flat plate. The top panel 42 is in the shape of a circular plate.

The peripheral wall 44 extends from the outer edge of the top panel 42 to the motor housing 12 and is continuous with the motor housing 12 around the axis parallel to the central axis of the shaft 22. The peripheral wall 44 has a cylindrical shape. The peripheral wall 44 is fitted onto the connecting portion 14. Between the peripheral wall 44 and the connecting portion 14, a seal member is provided.

The fastener 80 is a member that fixes the cover 40 to the connecting portion 14 of the motor housing 12. In the present embodiment, the connecting portion 14 has a female thread into which a bolt as the fastener 80 screws. Specifically, the fastener 80 includes a head 80a in contact with the outer surface of the top panel 42, with a seal washer 82 interposed between the head and the top panel 42. The fastener 80 also includes a stem 80b having a male thread to screw into the female thread of the connecting portion 14. The electric compressor 1 in the present embodiment includes a plurality of fasteners 80. The plurality of fasteners 80 are disposed at equal intervals along the circumferential direction of the peripheral wall 44.

The inverter 100 supplies power to the motor 30. The inverter 100 is contained in the inverter space S. The inverter 100 includes a board 110, an electronic component 120, a holder 130, a bus bar 140, and a tubular member 150.

The board 110 has a circuit pattern thereon. The board 110 is positioned orthogonal to the central axis of the shaft 22. The board 110 is in the shape of a circular plate.

The electronic component 120 is mounted on the board 110. In the present embodiment, the board 110 has an IPM 121, a capacitor 122, and the like mounted thereon, as the electronic component 120. The capacitor 122 is in contact with the housing body 13, with a radiator 123 interposed between the capacitor 122 and the housing body 13.

To the board 110, a high-voltage connector 124 and a low-voltage connector 125 are connected. The high-voltage connector 124 and the low-voltage connector 125 are attached to the outer surface of the top panel 42.

The holder 130 is composed of an insulating material. In the present embodiment, the holder 130 is composed of resin. The holder 130 contains the electronic component 120 (such as the capacitor 122 and a not-shown coil). In FIG. 1 and FIG. 2, for the purpose of illustration, a part of the holder 130 is not shown. The holder 130 supports the board 110. Specifically, the holder 130 includes a support portion 132 supporting the board 110. The support portion 132 supports the board 110 from the side opposite to the side where the top panel 42 is located, in relation to the board 110 in the thickness direction of the board 110. The holder 130 has a peripheral wall in contact with the outer edge of the board 110.

The bus bar 140 is electrically connected to the circuit pattern on the board 110. The bus bar 140 is integrated with the holder 130. In the present embodiment, the bus bar 140 is insert-molded with the holder 130. The bus bar 140 is disposed so that it can be in contact with and electrically connected to the motor housing 12. Thus, a grounding path is secured from the board 110 to the motor housing 12 through the bus bar 140. FIG. 1 and FIG. 2 show a bus bar 140 that connects the board 110 and the motor housing 12 at one place. The electric compressor 1 in the present embodiment also includes another bus bar 140 that connects the board 110 and the motor housing 12 at a place different from the said place. The bus bar 140 includes a connected portion 142 and a pressed portion 144.

The connected portion 142 is connected to the circuit pattern on the board 110, with solder. Specifically, the connected portion 142 is connected to the ground pattern of the circuit pattern, with solder. The connected portion 142 extends along the direction parallel to the fastening direction of the fastener 80. The fastening direction is the same as the axis direction of the stem 80b of the fastener 80. In the present embodiment, the connected portion 142 is connected to the circuit pattern with solder, with the connected portion 142 extending through the board 110. The connected portion 142 is in the shape of a plate.

The pressed portion 144 is disposed so that it can be in contact with and electrically connected to the connecting portion 14 of the motor housing 12. The pressed portion 144 extends in a direction orthogonal to the fastening direction of the fastener 80. The pressed portion 144 is in the shape of a plate.

The tubular member 150 is interposed between the cover 40 and the bus bar 140, with the fastener 80 inserted in the tubular member 150. The tubular member 150 presses the bus bar 140 toward the motor housing 12. Specifically, the tubular member 150 presses the pressed portion 144 toward the connecting portion 14 with the fastening force from the fastener 80. The direction of the fastening force from the fastener 80 is the same as the axis direction of the stem 80b of the fastener 80. The tubular member 150 is integrated with the holder 130. In the present embodiment, the tubular member 150 is insert-molded with the holder 130. The tubular member 150 is composed of metal.

The tubular member 150 includes a tubular segment 152. The tubular segment 152 has a shape such that the fastener 80 is insertable in the tubular segment 152. Specifically, the tubular segment 152 has a cylindrical shape. The tubular segment 152 has one end (on the upper side in FIG. 2) in contact with the top panel 42 of the cover 40. However, a member composed of metal (e.g., a spacer) may be interposed between the tubular segment 152 and the top panel 42. The tubular segment 152 has the other end (on the lower side in FIG. 2) in contact with the pressed portion 144.

As described above, in the electric compressor 1, the holder 130 containing the electronic component 120 supports the board 110, and the bus bar 140 integrated with the holder 130 is connected to the circuit pattern on the board 110. This can reduce the relative displacement of the electronic component 120 from the board 110 and improve the vibration resistance. A plurality of bus bars 140 supporting the board 110 on its circumference also provide excellent vibration resistance to the board 110. Further, in the electric compressor 1, the fastening force from the fastener 80 causes the tubular member 150 to press the bus bar 140 toward the motor housing 12, thereby allowing the bus bar 140 to electrically connect to the motor housing 12 strongly. Thus, the noise generated at the board 110 effectively moves to the motor housing 12 via the bus bar 140 connected to the circuit pattern. Therefore, the electric compressor 1 can achieve both the improvement in vibration resistance and the reduction in noise in the inverter 100.

Further, in the present embodiment, the connected portion 142 extends in the direction parallel to the fastening direction of the fastener 80, and the pressed portion 144 extends in a direction orthogonal to the fastening direction of the fastener 80. Accordingly, the dimension errors of the board 110 and the holder 130 in the direction parallel to the fastening direction of the fastener 80 can be absorbed at the connection between the connected portion 142 and the circuit pattern.

Further, since the cover 40 and the tubular member 150 are composed of an electrically conductive material, a grounding path can be secured from the cover 40 to the motor housing 12 through the tubular member 150 and the bus bar 140.

It should be understood that the embodiment disclosed herein is by way of example in every respect, not by way of limitation. The scope of the present disclosure is defined not by the above description of the embodiment but by the terms of the claims, and includes any modification within the meaning and scope equivalent to the terms of the claims.

Figure 3:
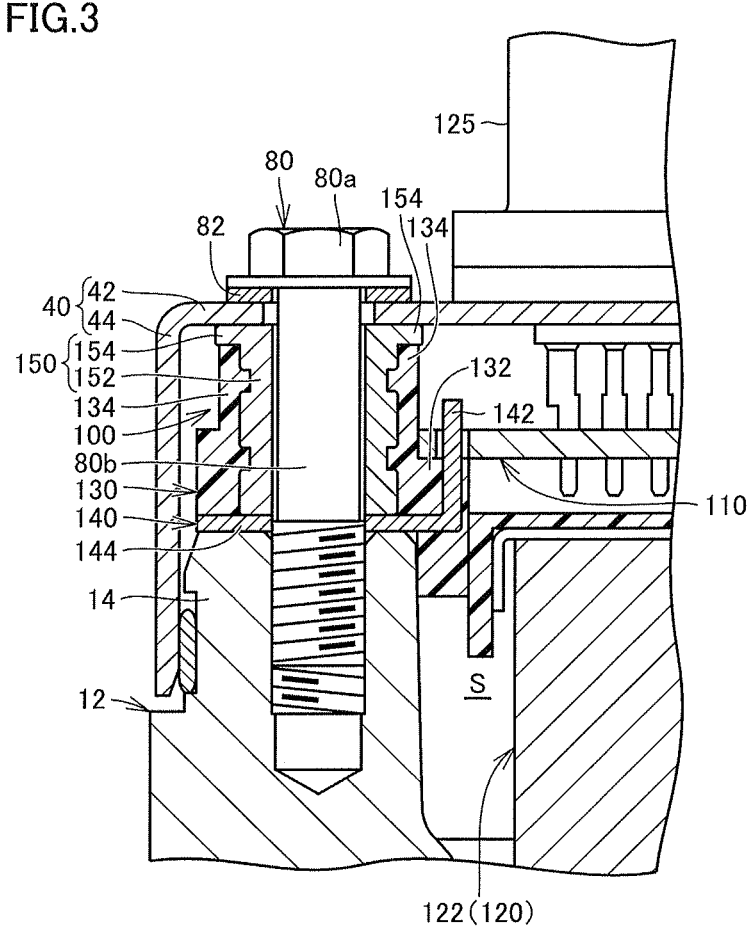
FIG. 3 schematically shows a part around a bus bar and a tubular member of a variation of the electric compressor shown in FIG. 1.

For example, as shown in FIG. 3, the tubular member 150 may further include a flange 154, and the holder 130 may further include an interposition portion 134.

The flange 154 protrudes outward in the radial direction of the tubular segment 152 from the end of the tubular segment 152 on the top panel 42 side (on the upper side in FIG. 3). The flange 154 is in the shape of a circular ring.

The interposition portion 134 is interposed between the flange 154 and the pressed portion 144. The interposition portion 134 is in the shape of a tube surrounding the tubular segment 152. Specifically, the interposition portion 134 has a cylindrical shape. The outer periphery of the tubular segment 152 is preferably roughened to achieve strong coupling between the tubular segment 152 and the holder 130.

In this mode, the fastening force from the fastener 80 acts on the bus bar 140 not only via the tubular segment 152 but also via the flange 154 and the interposition portion 134. Thus, the bus bar 140 can be strongly connected to the motor housing 12 with a larger contact area therebetween.

The flange 154 is not absolutely essential in the mode shown in FIG. 3. In the case with no flange 154, the interposition portion 134 may be interposed between the top panel 42 and the pressed portion 144, with the interposition portion 134 being in the shape of a cylinder in contact with and surrounding the tubular segment 152. In this case, the outer periphery of the tubular segment 152 is roughened. This mode can also bring about the same advantageous effects as those described above.

The inverter 100 may include a bus bar (not shown) exclusively for damping vibration that connects the connecting portion 14 to a dummy pattern different from the circuit pattern on the board 110, in addition to the bus bar 140 that connects the connecting portion 14 of the motor housing 12 to the circuit pattern on the board 110.

To be integrated with the holder 130, the tubular member 150 may be fitted into the holder 130, instead of being insert-molded with the holder 130. In this mode, the outer periphery of the tubular segment 152 is preferably roughened to achieve strong coupling with the holder 130.

Not all of a plurality of bus bars 140 need to be electrically connected to the circuit pattern. For example, a part of the bus bars 140 may be connected, with solder, to an electrically conductive layer formed on the board 110 alongside of but separated from the circuit pattern. Such a bus bar, although not serving as a grounding path, can physically couple the board 110 and the holder 130. Thus, the bus bar can satisfactorily prevent the relative displacement of the electronic component from the board and can improve the vibration resistance of the inverter 100.

The embodiment described above will now be summarized.

The electric compressor according to the present disclosure includes: a motor housing composed of an electrically conductive material and containing a motor that drives a compression mechanism; an inverter that supplies power to the motor; a cover defining, together with the motor housing, a space in which the inverter is contained; and a fastener fixing the cover to the motor housing. The inverter includes a board having a circuit pattern thereon; an electronic component mounted on the board; a holder composed of an insulating material, the holder containing the electronic component and supporting the board; a bus bar integrated with the holder, and electrically connected to the circuit pattern and the motor housing; and a tubular member interposed between the cover and the bus bar, with the fastener inserted in the tubular member. A fastening force from the fastener causes the tubular member to press the bus bar toward the motor housing.

In the electric compressor, the holder containing the electronic component supports the board, and the bus bar integrated with the holder is connected to the circuit pattern on the board. This can reduce the relative displacement of the electronic component from the board and improve the vibration resistance. Further, in the electric compressor, the fastening force from the fastener causes the tubular member to press the bus bar toward the motor housing, thereby allowing the bus bar to electrically connect to the motor housing strongly. Thus, the noise generated at the board effectively moves to the motor housing via the bus bar electrically connected to the circuit pattern. Therefore, the electric compressor can achieve both the improvement in vibration resistance and the reduction in noise in the inverter.

The bus bar may include a connected portion connected to the circuit pattern with solder, and a pressed portion disposed between the tubular member and the motor housing, so that the pressed portion is pressed by the tubular member.

In this case, preferably, the connected portion extends in the direction parallel to the fastening direction of the fastener, and the pressed portion extends in a direction orthogonal to the fastening direction of the fastener.

In this mode, the dimension errors of the board and the holder in the direction parallel to the fastening direction of the fastener can be absorbed at the connection between the connected portion and the circuit pattern.

The tubular member may include a tubular segment in which the fastener is insertable therein, and a flange protruding outward in the radial direction of the tubular segment from the end of the tubular segment adjacent to the cover. The holder may further include a tubular interposition portion interposed between the flange and the bus bar.

In this mode, the fastening force from the fastener acts on the bus bar not only via the tubular segment but also via the flange and the interposition portion. Thus, the bus bar can be strongly connected to the motor housing with a larger contact area therebetween.

The tubular member may include a tubular segment in which the fastener is insertable therein. The holder may further include a tubular interposition portion interposed between the cover and the bus bar, with the interposition portion being in contact with the outer periphery of the tubular segment. The outer periphery of the tubular segment may be roughened.

In this mode, the fastening force from the fastener acts on the bus bar not only via the tubular segment but also via the interposition portion. Thus, the bus bar can be strongly connected to the motor housing with a larger contact area therebetween.

The cover is preferably composed of an electrically conductive material, and the tubular member is preferably composed of an electrically conductive material.

This allows a grounding path to be secured from the cover to the motor housing through the tubular member and the bus bar.

What is claimed is:

1. An electric compressor comprising:
   a motor housing composed of an electrically conductive material and containing a motor that drives a compression mechanism;
   an inverter that supplies power to the motor;
   a cover defining, together with the motor housing, a space in which the inverter is contained; and a fastener fixing the cover to the motor housing,
the inverter including
- a board having a circuit pattern thereon,
- an electronic component mounted on the board,
- a holder composed of an insulating material, the holder containing the electronic component and supporting the board,
- a bus bar integrated with the holder, and electrically connected to the circuit pattern and the motor housing, and
- a tubular member interposed between the cover and the bus bar, with the fastener inserted in the tubular member, wherein a fastening force from the fastener causes the tubular member to press the bus bar toward the motor housing.

2. The electric compressor according to claim 1, wherein the bus bar includes
- a connected portion connected to the circuit pattern with solder, and
- a pressed portion disposed between the tubular member and the motor housing, so that the pressed portion is pressed by the tubular member.

3. The electric compressor according to claim 2, wherein the connected portion extends in a direction parallel to a fastening direction of the fastener, and the pressed portion extends in a direction orthogonal to the fastening direction of the fastener.

4. The electric compressor according to claim 1, wherein the tubular member includes
- a tubular segment in which the fastener is insertable therein, and
- a flange protruding outward in a radial direction of the tubular segment from an end of the tubular segment adjacent to the cover, and the holder further includes a tubular interposition portion interposed between the flange and the bus bar.

5. The electric compressor according to claim 1, wherein the tubular member includes a tubular segment in which the fastener is insertable therein,
the holder further includes a tubular interposition portion interposed between the cover and the bus bar, with the interposition portion being in contact with an outer periphery of the tubular segment, and
the outer periphery of the tubular segment is roughened.

6. The electric compressor according to claim 1, wherein the cover is composed of an electrically conductive material, and
the tubular member is composed of an electrically conductive material.

* * * * *